United States Patent [19]

Sagawa et al.

[11] Patent Number: 4,630,588
[45] Date of Patent: Dec. 23, 1986

[54] FUEL INJECTION TIMING CONTROL SYSTEM

[75] Inventors: Ryuichi Sagawa; Osamu Nagata, both of Kobe; Takashi Kajima, Hyogo, all of Japan

[73] Assignee: Mitsubishi Denki Kabushiki Kaisha, Tokyo, Japan

[21] Appl. No.: 554,274

[22] Filed: Nov. 22, 1983

[30] Foreign Application Priority Data

Nov. 25, 1982 [JP] Japan .................. 57-207292
Nov. 25, 1982 [JP] Japan .................. 57-207293

[51] Int. Cl.<sup>4</sup> .................................. F02M 31/00
[52] U.S. Cl. .................... 123/506; 123/198 D; 123/479
[58] Field of Search ........... 123/506, 357–359, 123/479, 198 D

[56] References Cited

U.S. PATENT DOCUMENTS

| | | | |
|---|---|---|---|
| 3,661,130 | 5/1972 | Eheim | 123/358 |
| 4,180,037 | 12/1979 | Hobo | 123/506 |
| 4,393,842 | 7/1983 | Otsuka | 123/479 |
| 4,423,485 | 12/1983 | Sami | 123/357 |

FOREIGN PATENT DOCUMENTS

| | | | |
|---|---|---|---|
| 0063523 | 10/1982 | European Pat. Off. | 123/506 |
| 0041462 | 3/1982 | Japan | 123/506 |
| 57-99238 | 6/1982 | Japan | 123/506 |
| 2061403 | 5/1981 | United Kingdom | 123/506 |

*Primary Examiner*—Carl Stuart Miller
*Attorney, Agent, or Firm*—Leydig, Voit & Mayer

[57] ABSTRACT

A fuel injection timing control system of an internal combustion engine of a compression ignition type including a fuel injection pump driven by a cam connected to the engine, and a valve operative to return a part of the fuel delivered by the fuel injection pump to fuel source. The advance angle of the cam is set beforehand at a value bigger than those assumed in the range for normal operation, and the real fuel injection timing is modified by actuating the valve according to operating conditions of the engine.

2 Claims, 8 Drawing Figures

FUEL INJECTION TIMING CONTROL SYSTEM

BACKGROUND OF THE INVENTION

This invention relates to a fuel control system of an internal combustion engine capable of readily adjusting the period and time of fuel injection without interrupting the operation of the internal combustion engine.

In one type of fuel control system of an internal combustion engine which is well known and widely adopted, a fuel injection pump of a constant stroke type operative to compress a liquid fuel sealed between a plunger and a barrel and raise its pressure by lifting the plunger by means of a cam linked thereto and a fuel valve automatically effecting fuel injection as it is loaded with a liquid fuel under high pressure are connected together through a fuel injection pipe.

In this type of fuel injection system, the fuel injection time is exclusively decided by the profile of the driving cam. Thus, when it is desired to alter the fuel injection timing, it has hitherto been usual practice to attain the end by modifying the position in which the cam is mounted on a cam shaft. This practice has made it necessary to interrupt the normal operation of the internal combustion engine.

DESCRIPTION OF THE PRIOR ART

Figure 1:
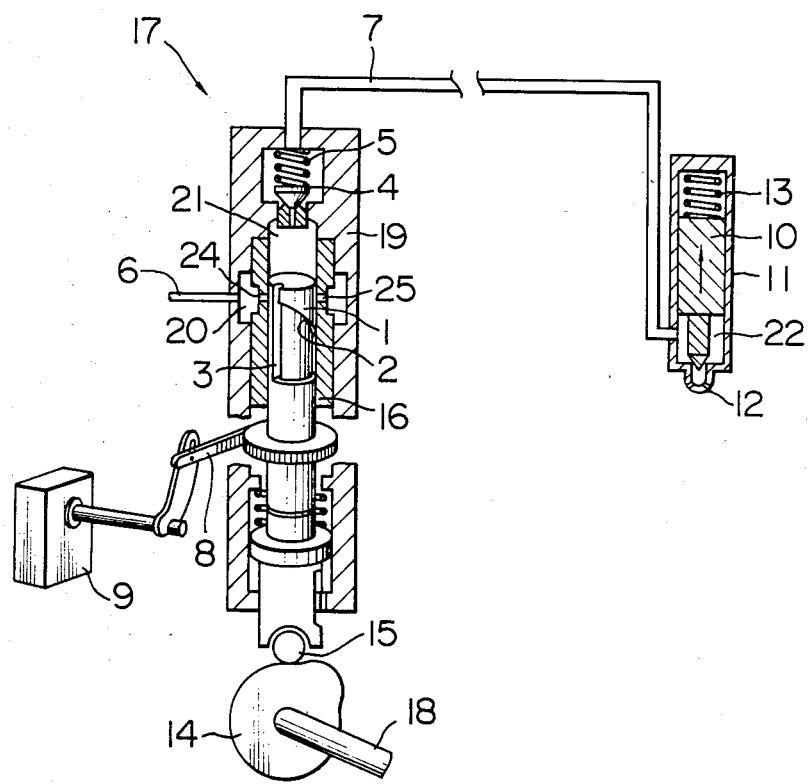
FIG. 1 is a schematic view of a fuel injection system of an internal combustion engine of the prior art.

FIG. 1 shows one type of fuel injection system of an internal combustion engine of the prior art in which a fuel injection pump 17 of a constant stroke type is connected to a closed nozzle type fuel valve 11 through a fuel injection pipe 7. In the fuel injection pump 17, a cam 14 mounted on a cam shaft 18 rotating in synchronism with the engine crank shaft causes plunger 1 to move in vertical reciprocatory movement in a barrel 19. That is, a roller 15 is moved upwardly as the cam 14 rotates, to thereby move the plunger 1 in vertical reciprocatory movement. A liquid fuel is fed through a fuel suction pipe 6 into a suction chamber 20, from which the fuel flows through a suction port 24 formed in a wall of a cylinder 16 into a pressure chamber 21 in an upper portion of the plunger 1 when the plunger moves downwardly. In an upward stroke of the plunger 1, the liquid fuel within the pressure chamber 21 is compressed and has its pressure raised as the suction port 24 is closed by an upper end of the plunger 1, to move a discharge valve body 4 upwardly against the biasing force of a spring 5. This permits the liquid fuel to flow through a fuel injection pipe 7 into a pressure accumulating chamber 22 of the fuel valve 11. When the pressure of the liquid fuel within the pressure accumulating chamber 22 overcomes the biasing force of spring 13, then needle valve 11 is lifted and the liquid fuel is injected through a nozzle 12 into a cylinder not shown. The injection of the fuel into the cylinder terminates when an oblique cutout 2 formed at one side of the plunger 1 is brought into communication with a fuel discharge port 25 and the liquid fuel in the pressure chamber 21 is discharged through a vertical groove 3 into the suction chamber 20. Stated differently, the volume of the fuel injected into the internal combustion engine during one stroke of the plunger may vary depending on the position of the oblique cutout 2 and may be decided by the rotational angle of the plunger 1. The rotational angle of the plunger 1 may be varied by means of a governor 9 through a rack 8. In the fuel injection system of the construction shown in FIG. 1 of the prior art, the top dead center of the piston of the internal combustion engine and the fuel injection initiating time (hereinafter fuel injection time) do not coincide with each other. Thus the cam 14 is mounted on the cam shaft 18 in a manner to have an advance angle.

Figure 2:
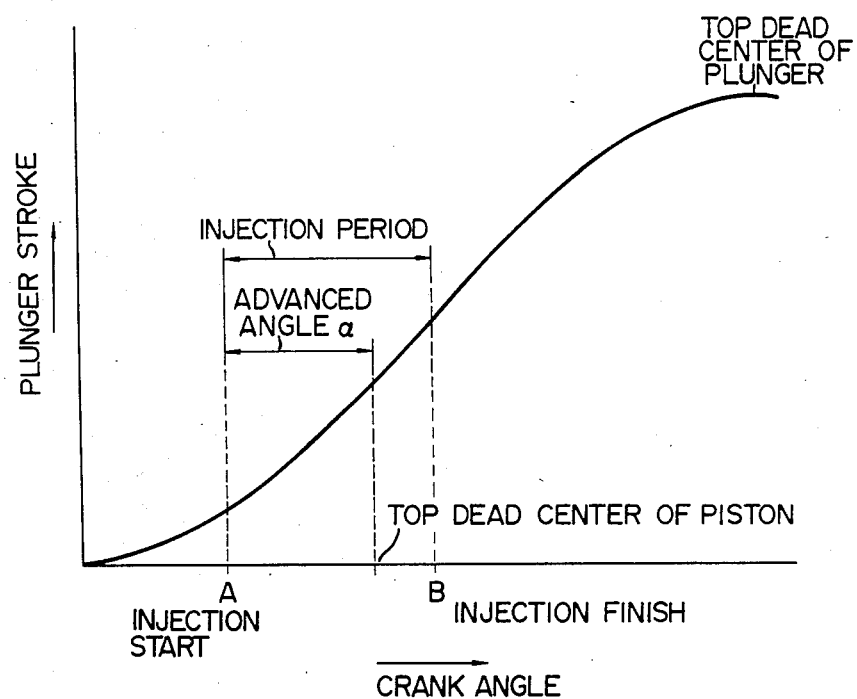
FIG. 2 is a diagrammatic representation of the relation between the crank angle $\theta$ and the stroke h of the plunger in the fuel injection system of the prior art shown in FIG. 1.

FIG. 2 is a graph showing the relation between the crank angle $\theta$ and the stroke h of the plunger 1. In the graph, injection begins at a point A and thereafter the piston reaches the top dead center. This section corresponds to an advanced angle $\alpha$ which is about 17 degrees in a four-stroke internal combustion engine of a large size. The upward stroke of the plunger 1 continues after termination of the fuel injection, and then the plunger 1 shifts to a downward stroke. In the fuel injection system of this construction of the prior art, it is necessary either to alter the profile of the cam or change the position in which the cam is mounted on the cam shaft, when it is desired to alter the fuel injection time. In any case, it is necessary to interrupt the operation of the internal combustion engine.

Meanwhile the advance angle $\alpha$ greatly influences the operation performance of the internal combustion engine, particularly its fuel consumption rate, and the optimum value of advanced angle $\alpha$ may greatly vary depending on the operation conditions of the internal combustion engine or on the quality of the liquid fuel. When the liquid fuel used shows a change in quality or when the internal combustion engine is one for driving a generator which shows often changes in load, it would be impossible to operate the internal combustion engine at an optimum fuel consumption rate by using the fuel injection system of the prior art shown in FIG. 1.

Several types of fuel control system which enable fuel injection timing to be varied during engine operation by eliminating the aforesaid disadvantages of the prior art have been proposed. In one proposed system, an oil discharge valve having a valve body which is mechanically linked to the plunger and may be controlled from outside by a position control signal, is mounted between the upper pressure chamber 21 of the fuel injection pump and the suction chamber 20 thereof. In another proposed system, a fuel control valve is provided, which is mounted between the fuel injection pump and the fuel injection valve and driven by a cam having advancing angle, to thereby enable the fuel injection time to be altered.

In these systems proposed to obviate the disadvantages of the prior art, it is necessary to additionally mount a linkage in the fuel injection pump or mount an additional cam on the cam shaft. When an attempt is made to incorporate these features in the fuel control system now in use, difficulties would be experienced in altering the design of the engine and a large sum of money would be required for design change. Expenses for remodelling the engine would also be great. The control system of the prior art incorporating therein the new features would suffer the disadvantage that continuation of the operation would become impossible in the event of the occurence of a failure.

SUMMARY OF THE INVENTION

This invention has been developed for the purpose of solving the aforesaid technical problems of the prior art. Accordingly, the invention has as one of its objects the provision of a fuel injection timing control system of an internal combustion engine capable of altering as desired the fuel injection time or the advance angle during the operation of the internal combustion engine, to thereby enable the internal combustion engine to operate at an optimum fuel consumption rate.

Another object is to provide a fuel injection timing control system of an internal combustion engine which can be incorporated in an internal combustion engine already in use.

A still another object is to provide a fuel injection timing control system of an internal combustion engine enabling operation of the internal combustion engine to be continued without interruption of engine operation when some trouble occurs in the fuel injection timing control system.

Other and further objects, features and advantages of the invention will appear more fully from the following description.

DETAILED DESCRIPTION OF THE PREFERRED EMBODIMENTS

Figure 3:
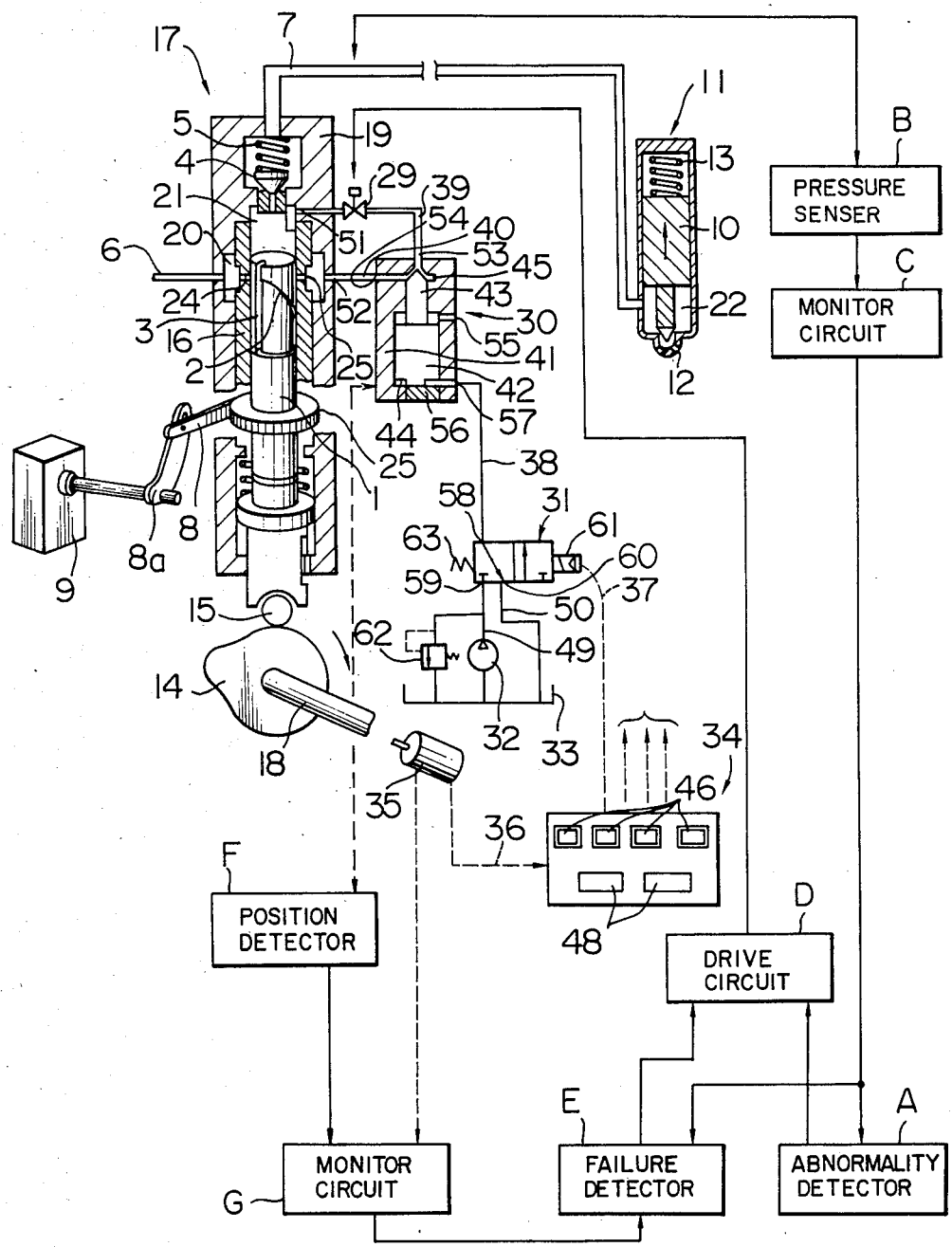
FIG. 3 is a schematic view of the fuel injection timing control system comprising one embodiment of the invention.

Preferred embodiments of the invention will now be described by referring to the accompanying drawings. FIG. 3 is a schematic view of a first embodiment in which the position of the cam 14 is set beforehand to provide a maximum advance angle in the actual operation range of internal combustion engines. In the case of large size internal combustion engines, the advance angle is selected greater by 5-8 degrees as compared with the advance angle adopted in conventional fuel injection devices, and the value may vary depending on the type of the combustion engine. Formed at one side of an upper portion of barrel 19 of the fuel injection pump 17 is a spill port 51 opening at a top end of the pressure chamber 21 and maintained in communication with an inlet port 53 of an oil discharge valve 30 through a connecting pipe 39. Formed at a side of a central portion of the barrel 19 a fuel discharge port 52 which is maintained in communication with an outlet port 54 of the fuel discharge valve 30 through a fuel discharge pipe 40.

The oil discharge valve 30 includes a barrel 41, a control piston 42 contained in the barrel 41 and a closing needle 43 also contained in the barrel 41 and disposed above the control piston 42. The control piston 42 and closing needle 43 which can move in sliding movements in the barrel 41 are designed so that their cross-sectional areas have the ratio of about 4:1 to increase force by about fourfold. Threadably connected to a bottom wall of the barrel 41 is a plug 56 which cooperates with the control piston 42 to define therebetween a control chamber 44. A control port 57 opening in the control chamber 44 is formed at a side of a lower portion of the barrel 41, while a drain port 55 is formed at a side of its central portion to release the oil which is collected at an upper end of the control piston 42 or a lower end of the closing needle 43. The inlet port 53 and outlet port 54 are maintained in communication with each other through a communicating chamber 45 inside the barrel 41. However, when the closing needle 43 moves to its uppermost position, the inlet port 53 near the communicating chamber 45 provides a seat for the closing needle 43, so that the closing needle 43 blocks communication between the inlet port 53 and communicating chamber 45 or outlet port 54.

The control port 57 of the oil discharge valve 30 is connected through a fluid pressure pipe 38 to an outlet port 58 of a solenoid-operated valve 31 which is formed with a pressure port 59 and a drain port 60 besides the outlet port 58. An electric signal supplied to the solenoid-operated valve 31 moves a spool built therein to selectively connect the outlet port 58 to the pressure port 59 or drain port 60. More specifically, when an electric signal is supplied to solenoid 61 of the solenoid-operated valve 31, the spool, not shown, is driven to move against the biasing force of a spring 63, to bring the pressure port 59 into communication with the outlet port 58. When the electric signal is removed, the spool is restored to its original position by the biasing force of the spring 63 and closes the pressure port 59, to bring the outlet port 58 into communication with the drain port 60.

The solenoid-operated valve 31 of the aforesaid construction is referred to as a single solenoid spring return type. However, the invention is not limited to the aforesaid specific type of solenoid-operated valve and other type of solenoid-operated valve may be used. For example, when a solenoid-operated valve of a double solenoid type is used, switching of the solenoid-operated valve can be controlled by supplying an electric signal to either one of the two solenoids. In the solenoid-operated valve of this construction, the number of a solenoid drive circuit and wires for providing connections would be doubled as compared with the use of the solenoid-operated valve of the single solenoid spring return type. However, the former can be expected to effect switching at higher speed than the latter. When it is required to effect switching at high speed, a servo valve of an electrohydraulic type may be used. This type of servo valve can effect switching at high speed, although it is expensive.

A high pressure hydraulic pump 32 raises the pressure of a working fluid in a reservoir 33 to supply the working fluid under high pressure to the pressure port 59 of the solenoid-operated valve 31 through a distributing pipe 49. In the control system according to the invention, the high pressure hydraulic pump 32 is a source of high pressure fluid. When the internal combustion engine is of a multicylinder type, branch pipes supply the high pressure fluid from the distributing pipe 49 to pressure ports of respective solenoid valve of cylinders. Meanwhile the reservoir 33 which functions as a source of low pressure fluid is connected to the drain port 60 of the solenoid-operated valve 31 through a return pipe 50. The distributing pipe 49 has a pressure adjusting valve 62 mounted therein to keep constant the high pressure of the fluid. Also, an accumulator may be mounted in the distributing pipe 49 to minimize fluctuations in the pressure of the high pressure fluid. When the pressure adjusting valve 62 is dispensed with, it would be necessary to use a hydraulic pump of the kind which would not case excessively high pressure in the distributing pipe 49, such as a velocity type high pressure hydraulic pump.

A resolver 35 is mounted on the cam shaft 18 by a fixture, not shown, for rotation therewith as a unit, to perform the function of detecting the rotational angle of the cam shaft 18 or a crank angle. The invention is not limited to the specific form of the resolver 35 but any known means, such as a synchronizer, a shaft encoder or a potentiometer, for example, may be used for detecting the rotational angle of the cam shaft 18. The resolver 35 is connected through a wire 36 to a control box 34 for transmitting an angle information thereto. The control box 34 includes a setter 46 and an indicator 48 contained therein, and is connected to the solenoid-operated valve 31 through a wire 37 to supply an electric signal thereto. The setter 46 which may comprise a digital switch of a decimal system has the function of setting an advance angle α or a crank angle for supplying an electric signal. Thus the setter 46 is of the same number as the cylinder of the engine. Although the number of the cylinders is not restrictive, the control box 34 is shown as being used with the engine of four cylinders. The indicator 48 has the function of indicating the crank angle and engine speed and may be in the form of a light emitting diode of a decimal system, for example.

A cut-off valve 29 may be mounted in the connecting pipe 39. In the event that a failure occurs in the oil discharge valve 30 or the means for driving same, operation of the internal combustion engine can be continued without interruption by rendering the cut-off valve 29 operative as soon as the failure is sensed. As means for sensing such failure, abnormality detecting means A, which monitors the manner of injection of the liquid fuel to detect any abnormality in the injected fuel, may be used.

When the abnormality detecting means A is used, for a example, a pressure sensor B is mounted in the fuel injection pipe 7, and a monitor circuit C is used for monitoring the injection pressure of the fuel and supplying an output signal to the abnormality detecting means A. The abnormality detecting means A operates so that by the fact that the one occurrence of fuel injection during one complete revolution of the cam 14 during engine operation, it checks the occurrence of the pressure wave of the fuel and determines that some abnormality exists in case no pressure wave is sensed during more than one rotation of the engine over a certain load (30% load, example). When this situation prevails, the abnormality detecting means A renders the cut-off valve 29 operative through a drive circuit D.

Failure detecting means E for detecting the failure of an electrical device for driving the oil discharge valve 30 may be separately mounted for rendering the cut-off valve 29 operative by its output. For example, the movement of a valve body 42 of the oil discharge valve 30 may be detected by a position detector F and monitored by a monitor circuit G. A differential transformer or a limit switch may be used as the position detector F, for example. The failure detecting means E checks the cycle of signals from the position detector F and the cycle of signals from the pressure sensor B to determine the presence of a failure and supplies a signal to the drive circuit D to render the cut-off valve 29 operative.

By incorporating in a control circuit an electronic circuit section of the sensing means for the abnormality or failure of the fuel injection timing control system, it is possible to obtain an overall compact size in an electronic device. By virtue of the aforesaid feature of the invention, it is possible for the internal combustion engine to continue its operation even if trouble occurs in the oil discharge valve 30 or the device for driving same.

Figure 4:
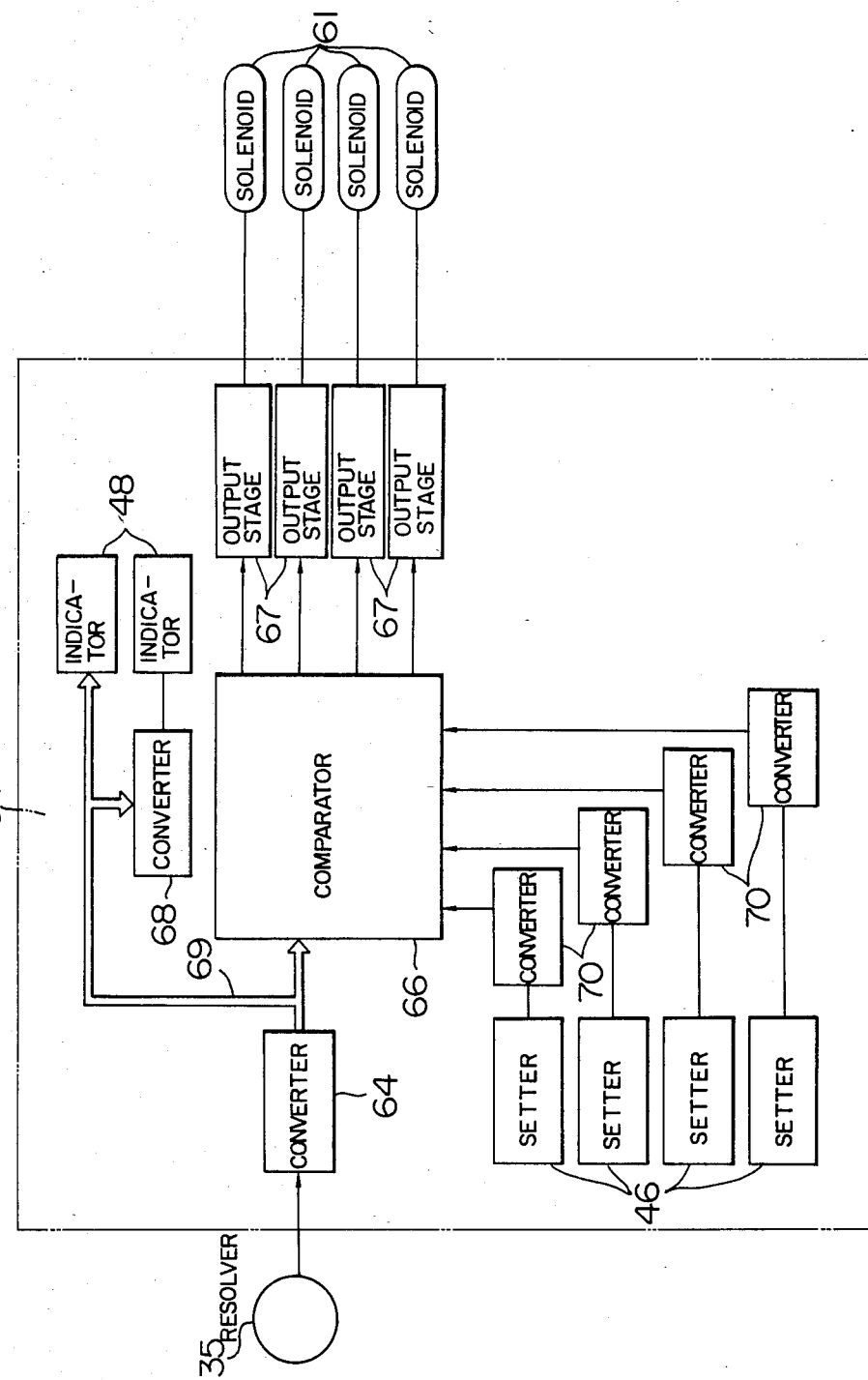
FIG. 4 is a block diagram of the control box.

FIG. 4 is a block diagram of one constructional form of control box 34. The resolver 35 produces an angle signal which is changed to a binary digital angle signal by a converter 64 and input to a comparator 66. Meanwhile a decimal advance angle α set in the setter 46 is changed to a binary digital signal by a converter 70 and input to the comparator 66. The two types of signal described hereinabove are compared with each other in the comparator 66 which, when the actual crank angle reach the set value, supplies to an output stage 67 a pulse signal of a predetermined duration which is amplified and energizes the solenoid 61 of the solenoid-operated valve 31. Theoretically, the duration of the pulse signal would have only to be greater in value than a maximum value of the fuel injection period and may vary depending on the size and type of the internal bomustion engine. In a marine engine of a large size, about 90 degrees would be enough, for example. A frequency to voltage converter 68 receives binary digital signal of angle and converts to engine speed. The indicator 48 indicates the engine speed and the crank angle.

Operation of the fuel injection timing control system according to the invention constructed as aforesaid will now be described. Assume that the advance angle of an optimum value is set in the setter 46. The optimum value of the advance angle α is substantially decided in test run of engine so as to minimize the fuel consumption rate according to each engine speed and the load applied thereto. Value α can be modified according to specific features of each cylinder and the environment in which the engine operates. Stated differently, the optimum value obtained in the test run is modified so that maximum values of the exhaust gas temperature and combustion pressure will not exceed the design limit value. The position in which the cam 14 is mounted on the cam shaft 18 is selected to have an angle slightly larger (by about 3 degrees, for example) than the maximum value of the optimum advance angle α obtained in the test run, so that the position of the cam 14 can be modified in conformity with changes in environment, such as air temperature and cooling water temperature, and aging effect.

Figure 5:
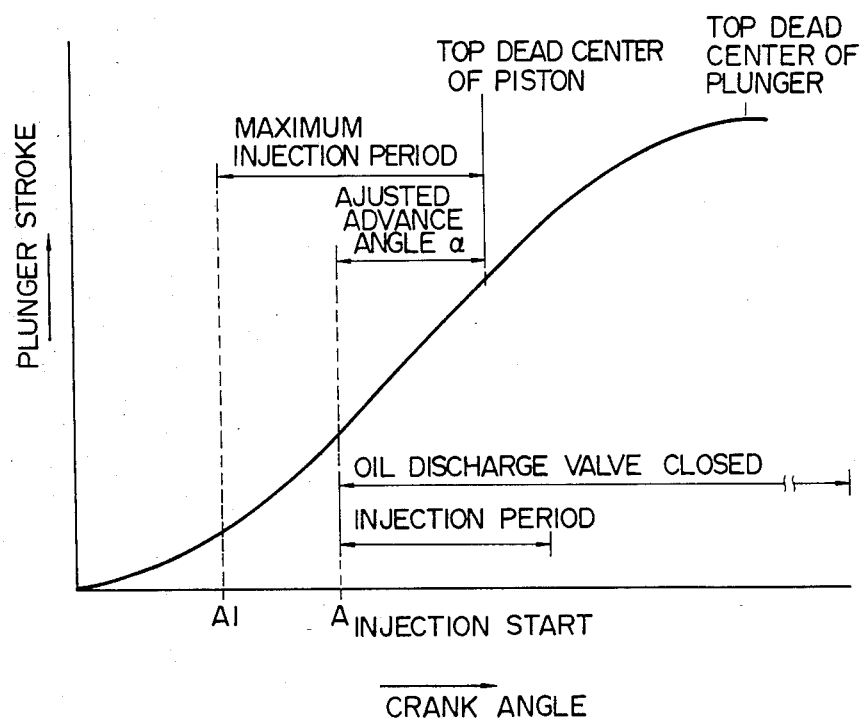
FIG. 5 is a diagrammatic representation of the relation between the crank angle $\theta$ and the stroke h of the plunger in the control system shown in FIG. 4.

FIG. 5 is a graph showing the relation between the rotational angle (crank angle θ) of engine and the stroke h of the plunger 1. This relation will be described by referring to FIGS. 3 and 5. When the cam 14 is in the condition shown in FIG. 3 in which the plunger 1 is not lifted by the cam 14, the crank angle θ detected by the resolver 35 does not reach the advance angle α set in the setter 46 of the control box 34 (point A in FIG. 5), so that the solenoid 61 of the solenoid-operated valve 31 remains de-energized and the outlet port 58 is communicated with the drain port 60. As a result, the control port 57 of the oil discharge valve 30 is maintained in communication with the reservoir 33 which is a low pressure fluid source through the pressure fluid pipe 38, solenoid-operated valve 31 and return pipe 50, so that the control chamber 44 is kept at an atmospheric pressure level. Meanwhile the liquid fuel sent to the fuel injection pump 17 through the fuel suction pipe 6 is filled in the pressure chamber 21. The liquid fuel which is slightly pressurized while being fed through the suction pipe 6 acts on a top end of the closing needle 43 as it flows from the suction chamber 20 into the communicating chamber 45 of the oil discharge valve 30, to force the closing needle 43 and hence the control piston 42 to move downwardly and bring the inlet port 53 and outlet port 54 of the oil discharge valve 30 into communication with each other.

As the cam 14 rotates in the direction of an arrow in FIG. 3 and the plunger 1 is moved upwardly by the cam 14 through the roller 15 to a position A1 shown in FIG. 5, an upper edge of the plunger 1 blocks the suction port 24 to compress the fuel inside the pressure chamber 21. However, the fuel inside the pressure chamber 21 flows to the suction chamber 20 of the fuel injection pump 17 through the spill port 51 and the communicating chamber 45 of the oil discharge valve 30, so that the fuel in the pressure chamber 21 shows no rise in pressure. Thus the discharge valve 4 is kept closed by the biasing force of the spring 5, and no fuel is injected from the fuel valve 11.

As the cam 14 continues its rotation and the crank angle reaches the angle set in the setter 46 of the control box 34 (point A in FIG. 5), an electric signal is supplied from the control box 34 to the solenoid-operated valve 31 to energize the solenoid 61, so that the outlet port 58 is brought into communication with the pressure port 59. This allows the working fluid under high pressure to flow from the high pressure fluid pump 32 serving as a high pressure fluid source to the control chamber 44 of the oil discharge valve 30 through the pressure fluid pipe 38, thereby forcing the control piston 42 to move upwardly and lifting the closing needle 43 to its uppermost position. With the inlet port 53 near the communicating chamber 45 providing a seat to the closing needle 43, the top end of the closing needle 43 brings the inlet port 53 and outlet port 54 out of communication with each other, thereby blocking the flow of the fuel from the inlet port 53 to the suction chamber 20. This raises the pressure of the fuel in the pressure chamber 21 of the fuel injection pump 17, and to move the discharge valve 4 upwardly by overcoming the biasing force of the spring 5. This allows the fuel to flow through the fuel injection pipe 7 into the pressure accumulating chamber 22 of the fuel valve 11. When the pressure of the fuel in the pressure accumulating chamber 22 overcomes the biasing force of the spring 13, the needle valve body 10 is lifted, to supply the fuel by injection into the cylinder, not shown, through the nozzle 12.

The fuel injection pressure is as high as about 1000 atg (kg/cm²G). To prevent the closing needle 43 from being moved downwardly by this high pressure, it is necessary that suitable values should be selected for the pressure of the high pressure fluid fource and for the cross-sectional areas of the control piston 42 and inlet port 53. For example, assume that the following values are selected.

Diameter of the inlet port: $d_v = 8$ mm
Diameter of the closing needle: $d_n = 12$ mm
Diameter of the control piston: $d_s = 22$ mm
Pressure of the high pressure
fluid source: $p_a = 200$ at g Then, the allowable maximum pressure of the liquid fuel is as follows:

$$p_n \cdot d_v^2 = p_s \cdot d_s^2$$

$$p_n = p_s \left(\frac{d_s}{d_v}\right)^2 = 200 \times \left(\frac{22}{8}\right)^2 = 1510 \text{ at } g$$

Further rotation of the cam 14 brings the cutout 2 at one side of the plunger 1 into communication with the fuel discharge port 25. As a result, the liquid fuel in the pressure chamber 21 flows through the groove 3 into the suction chamber 20, so that the fuel that has been fed to the fuel valve 11 has its pressure reduced and the injection is finished. The volume of the fuel injected is controlled in the same manner as is done in the fuel injection system of the prior art, i.e. by supplying an output of the governor 9 to the plunger 1 through the rack 8 and pinion 23 to cause same to rotate.

The plunger 1 continues its upward movement even after the injection is terminated and begins to move downwardly after passing by the top dead point. The cam 14 further continues its rotation, and the solenoid 61 of the solenoid-operated valve 31 is de-energized as the electric signal supplied from the control box 34 is interrupted, to thereby bring the ports of the solenoid-operated valve 31 to their original positions by the biasing force of the spring 63. That is, the pressure port 59 is closed and the outlet port 58 is connected to the drain port 60. This causes the fuel in the control chamber 44 of the oil discharge valve 30 to flow to the reservoir 33 through the solenoid-operated valve 31, thereby causing the pressure of the fuel in the control chamber 44 to drop to an atmospheric pressure level. This moves the closing needle 43 to move downwardly, so that the pressure chamber 21 and suction chamber 20 of the fuel injection pump 17 are brought into communication with each other through the oil discharge valve 30.

Though the plunger lifing duration depends on the type of the internal combustion engine, the angular width is about 50 degrees by crank angle typically. So the electric signal supplied from the control box 34 has enough pulse duration corresponding to about 90 degrees.

In summary, the feature of the invention is that the cam is set at its maximum advanced angle before the operation of the engine and the fuel compressed by plunger 1 is returned to the suction side of the fuel injection pump in a volume corresponding to a reduction in the advance angle $\alpha$, and adjust the initiation of the operation of the plunger to inject the fuel, to thereby fluidly effect adjustments of the advance angle $\alpha$. The aforementioned suction side of the fuel injection pump is not restricted to the suction chamber of the fuel injection pump, but it may be a tank for supplying the liquid fuel or a sump (which is communicated with the reservoir) for collecting the spilled fuel.

Figure 6:
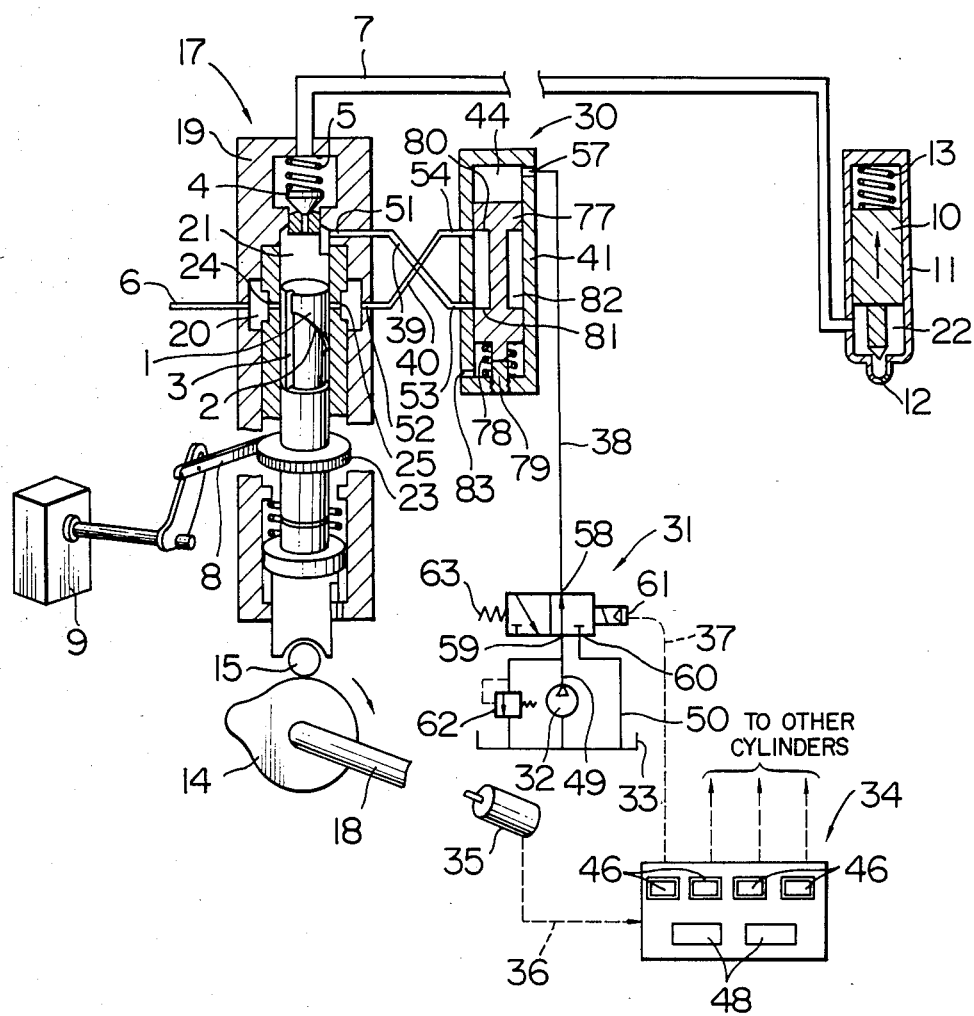
FIG. 6 is a schematic view of the fuel injection timing control system comprising another embodiment.

FIG. 6 shows the fuel injection timing control system comprising another embodiment. In this embodiment, the fuel discharge valve 30 includes a valve body 77 slidably inserted in the barrel 41 which is formed at one side with the inlet port 53 and outlet port 54 capable of being maintained in communication with each other through a control groove 82 formed in the valve body 77. The inlet port 53 and outlet port 54 are maintained with the pressure chamber 21 and suction chamber 20 of the fuel injection pump 17 through the communicating pipe 39 and fuel discharge pipe 40 respectively. A spring 78 for biasing the valve body 77 upwardly is mounted on a bottom wall of the barrel 41 which has a stopper 79 threadably connected thereto to restrict the downward movement of the valve body 77. The valve body 77 has a control edge 81 located at a lower end of the control groove 82 for opening and closing the inlet port 53. The valve body 77 also has an edge 80 at an upper end of the control groove 92 which is restricted by the stopper 79 and prevented from closing the outlet port 54 by an edge 80, so that the outlet port 54 is maintained in communication with the control groove 82 at all times. When no pressure acts in the control chamber 44 and the spring 78 is not compressed, the inlet port 53 is closed by the control edge 81 of the valve body 77. However, when the valve body 77 is in its lowermost position, the control edge 81 opens the inlet port 53 to bring same into communication with the control groove 82. The control port 57 is formed at an upper portion of the barrel 41 and maintained in communication with the control chamber 44 restricted between an upper end of the valve body 77 and a top wall of the barrel 41 while being connected to the outlet port 58 of the solenoid-operated valve 31 through the pressure fluid pipe 38. Formed at a lower portion of the valve body 77 is an air port 83 which allows the interior of the barrel to be maintained at an atmospheric pressure. Except for the oil discharge valve 30, other parts of the system are similar to those of the embodiment shown in FIG. 3, so that their description will be omitted.

Operation of the embodiment of the aforesaid construction will be described. In FIG. 6, the cam 14 is shown in a position in which it does not moves the plunger 1 upwardly. When the plunger 1 and cam 14 are in this position, the solenoid 61 of the solenoid-operated valve 31 is energized by an electrical signal from the control box 34 to keep the outlet port 58 in communication with the pressure port 59. This allows the working fluid to be supplied from the high pressure hydraulic pump 32 to the control chamber 44 of the oil discharge valve 30, to move the valve body 77 against the biasing force of the spring 78 to its lowest position which is determined by the stopper 79. When the valve body 77 is in this position, the control edge 81 opens the inlet port 53 to bring the pressure chamber 21 and suction chamber 20 of the fuel injection pump 17 into communication with each other through the control groove 82 of the oil discharge valve 30.

Rotation of the cam 14 in the direction of an arrow shown in FIG. 6 moves the plunger 1 upwardly to a position in which it closes the suction port 24 and fuel discharge port 25. Then, the liquid fuel in the pressure chamber 21 is compressed. But, since the liquid fuel in the pressure chamber 21 flows to the suction chamber 20 through the spill port 51 and the control groove 82 of the oil discharge valve 30, no rise in pressure occurs in the liquid fuel in the pressure chamber 21 and no fuel is injected from fuel valve 11.

Further rotation of the cam 14 bring the crank angle to a level set in the setter 46 in the control box 34. Then, the electrical signal fed from the control box 34 to the solenoid-operated valve 31 is interrupted, so that the solenoid-operated valve 31 is actuated by the biasing force of the spring 63 and the outlet port 58 is switched from the pressure port 59 to the drain port 60. This allows the liquid fuel in the pressure chamber 44 to flow to the reservoir 33 to bring the pressure in the pressure chamber 44 to the atmospheric pressure level, so that the valve body 77 is moved upwardly by the biasing force of the spring 78. With the inlet port 53 being closed by the control edge 81, the liquid fuel in the pressure chamber 21 has its pressure raised to be injected into the cylinder, not shown, through the fuel valve 11.

As the plunger 1 begins to move downwardly following completion of the injection (after 90 degrees following start of the upward movement, for example), an electric signal is fed again from the control box 34 to energize the solenoid 61 of the solenoid-operated valve 31, to allow the working fluid to flow from the high pressure hydraulic pump 32 to the control chamber 44 of the oil discharge valve 30. Thus the valve body 77 is moved downwardly to the position in which it abuts against the stopper 79 as it did before the operation was started.

The feature of the embodiment shown in FIG. 6 is that in the event that the control box 34 or high pressure hydraulic pump 32 their function, it is impossible to control the injection at its best timing, but fuel injection can be continued with the timing set for the cam. Thus operation of the internal combustion engine can be continued without interruption. This feature would be particularly important when the internal combustion engine is for marine use, because the vessel can continue navigation under its own power.

The aforesaid feature of the embodiment shown in FIG. 6 and the feature of the embodiment shown in FIG. 3 including the cut-off valve 29 would contribute greatly to improving the reliability of the internal combustion engine during its operation.

Figure 7:
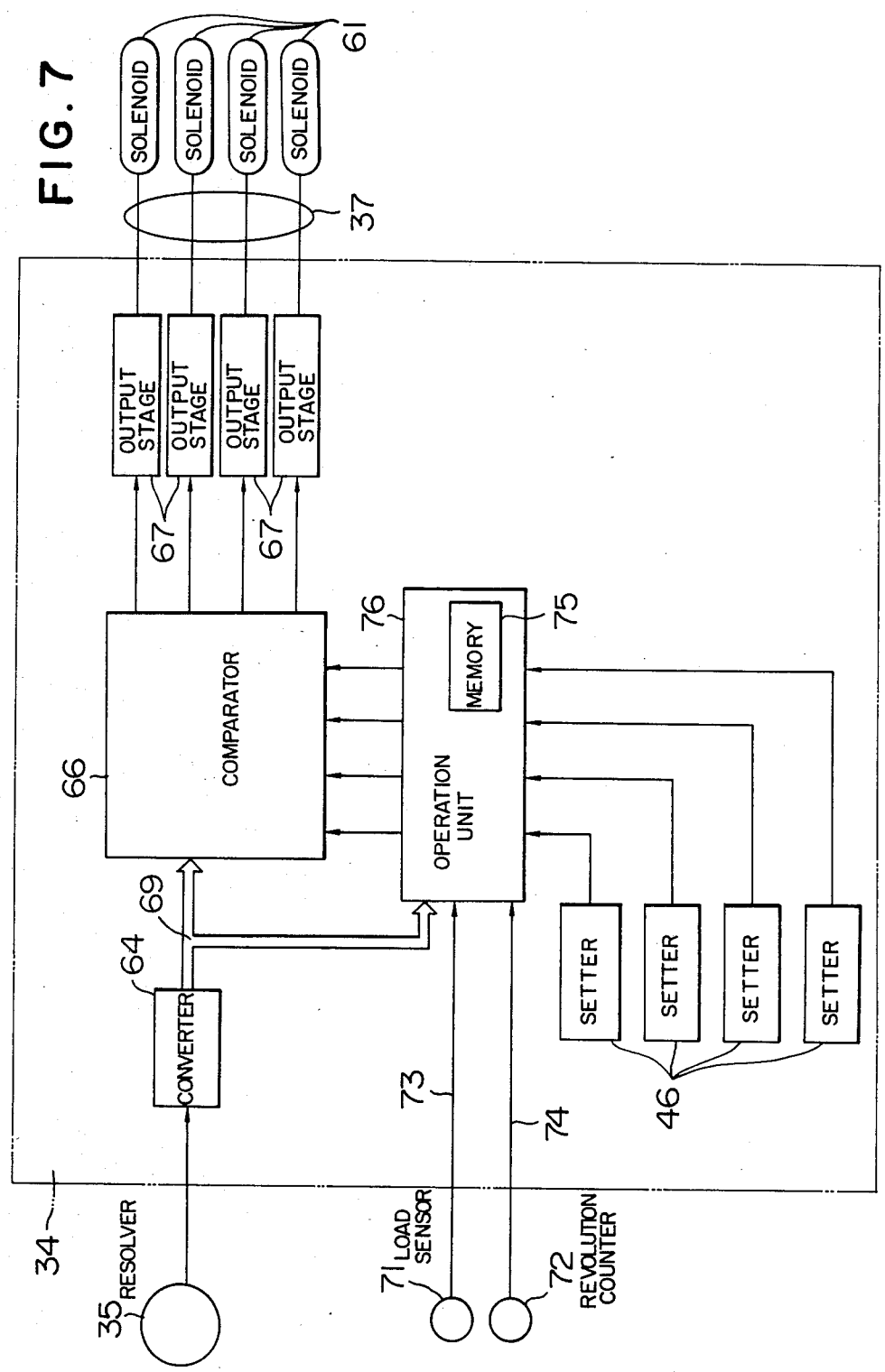
FIG. 7 is a block diagram of the other control box.

FIG. 7 shows another constructional form of control box 34 according to the invention which is distinguished from the constructional form of control box 34 shown in FIG. 4 in that a load sensor 71 and an rpm. sensor 72 are mounted therein and the frequency to voltage converter 68 is replaced by an operation unit 76. In this control box 34, the load sensor 71 may be in the form of a rack position detector utilizing a differential transformer. However, other means including a thermometer for measuring the temperature of the exhaust gases, a manometer for measuring the pressure of the air intake and a shaft torque meter for directly measuring the torque may be used instead. A tachometer which generates voltage proportional to the rotational speed is usually used as the rpm. sensor 72. However, the rpm. sensor 72 can be dispensed with if a calculation for rpm. is done by the operation unit 76 based on an output of the angle converter 64.

The control box 34 shown in FIG. 7 will be described mainly by referring to the operation unit 76 which is in the form of a microcomputer, for example. A load signal 73 and an rpm. signal 74 are read into the operation unit 76 from the load sensor 71 and rpm. sensor 72, respectively, through an analog-to-digital converter, not shown. Meanwhile the operation unit 76 comprises a memory 75 which stores therein, in addition to a program, a series of optimum advance angles α determined in the test run of the engine according to each engine speed, and load. The operation unit 76 reads out an optimum advance angle α (which is referred to as a master signal) from the memory 75 in accordance with the load signal 73 and rpm. signal 74 input thereto. After adding to or reducing from the master signal a setting signal prepared in the setter 46 which is the switches to compensate for variations in conditions, the operation unit 76 sends the adjusted master signal to the comparator 66. The engine shown in FIG. 7 is four cylinder engine. However, the invention is not limited to this specific number of cylinders, but the number of the cylinders may be greater or smaller than four.

When the operation speeds of the solenoid-operated valve 31 and oil discharge valve 30 are not enough high compared with the rotational speed (rpm.) of the internal combustion engine, the precision with which control of the advance angle α is effected might be affected by the rpm. of the internal combustion engine. When this is the case, the control precision can be improved by compensating for a lag in the operation of the solenoid-operated valve 31 and oil discharge valve 30 in accordance with the rpm. More specifically, the following compensating angle only has to be deducted from the result of the calculation.

$$\frac{\Delta T}{12 \cdot n} \text{ degrees in the case of a four-cycle engine}$$

$$\frac{\Delta T}{6 \cdot n} \text{ degrees in the case of a two-cycle engine}$$

where
ΔT: Total time lag in the operation of the solenoid-operated valve and oil discharge valve.
n: rpm. of the internal combustion engine.

If the compensated figures are stored in the master signal memory 75, then the calculation for correction can be eliminated, thereby simplifying the calculation in the operation unit 76.

The control box 34 shown in FIG. 7 has the feature that the advance angle α is automatically selected. More specifically, the optimum values of the advance angle α obtained beforehand and stored in the memory and a suitable optimum value is read out of the memory in accordance with the rpm. and the load sensed by the respective sensors. In the case of a marine engine, the load is substantially proportional to the third power of the rpm. Thus the advance angle α may be obtained by using the rpm. alone, to thereby dispense with the load sensor 71.

Figure 8:
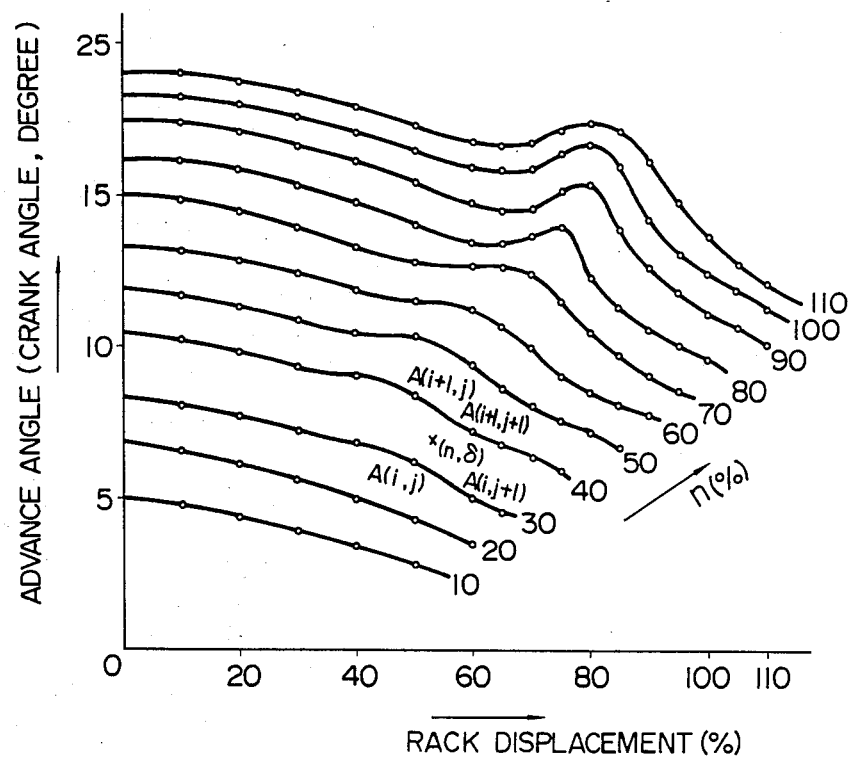
FIG. 8 is a diagrammatic representation of one embodiment of the process for reading out the advance angle $\alpha$.

Proposals have been for various processes to read out the advance angle α. FIG. 8 shows one example of such processes. In the diagram shown in FIG. 8, the abscissa represents in percent the rack displacement δ indicating a load applied to the internal combustion engine, and the ordinate indicates in degree the advance angle α, with a parameter of the rpm. indicated in percent. The points represented by 0 in the diagram are stored in the memory 75 as typical points master signal, and calculation is done by interpolation on the typical points to obtain a desired advance angle α. The calculation may be done as follows:

$$\alpha' = \frac{n - n^-}{n^+ - n^-} \{A(i+1, j) - A(i, j)\} + A(i, j).$$

$$\alpha'' = \frac{n - n^-}{n^+ - n^-} \{A(i+1, j+1) - A(i, j+1)\} + A(i, j+1).$$

$$\alpha = \frac{\delta - \delta^-}{\delta^+ - \delta^-} (\alpha'' - \alpha') + \alpha'.$$

$$n^- < n \leq n^+$$

$$\delta^- < \delta \leq \delta^+$$

where

A(i, j): the value of the advance angle at the typical point $n^-$, $\delta^-$.
A(i, j+1): the value of the advance angle at the typical point $n^-$, $\delta^+$.
A(i+1, j): the value of the advance angle at the typical point $n^+$, $\delta^-$.
A(i+1, j+1): the value of the advance angle at the typical point $n^+$, $\delta^+$.

In the fuel injection timing control system of an internal combustion engine according to the invention, the pressure of the fuel in the pressure chamber of the fuel injection pump drops and the injection is terminated when the electric signal fed from the control box is early interrupted by reducing the duration of the pulse of the signal. Therefore, by effecting adjustments of the duration of the pulse of the electric signal, it is possible to define upper limit of the volume of the injected fuel, to thereby enable the system concurrently to serve as a torque limiter which has effect in protecting the internal combustion engine from over torque. Moreover, by increasing or decreasing the pulse duration of the electric signal in conjunction with the target value of the rpm. of the engine, it is possible to effect adjustments of the volume of the injected fuel. Thus the governor 9 can be dispensed with, if the oil discharge valve 30 is controlled in this way.

In still another embodiment of the invention, the oil discharge valve 30 may be eliminated and the solenoid-operated valve 31 may be directly connected to the fuel injection pump 17. This would eliminate a lag in the operation of the oil discharge valve and improve the response of the system. However, it would be necessary to use a solenoid-operative valve of high power capable of withstanding the pressure under which fuel injection is carried out.

From the foregoing description, it will be appreciated that in the fuel injection timing control system according to the invention, optimum advance angles determined beforehand are set in a setter of a control circuit and a desired optimum value in conformity with prevailing rpm. of the engine and the load applied thereto is taken out during operation, thereby enabling the internal combustion engine to operate at an optimum fuel consumption rate.

According to the invention, setting of the optimum advance angle can be effected automatically, not manually, so that the fuel injection timing control system is low in cost and high in operation efficiency.

In the fuel injection timing control system according to the invention, the internal combustion engine can continue its operation even if trouble occurs in the system, resulting in high reliability of the engine in operation.

Having described preferred embodiments of the invention, it is believed obvious that modifications and variations of our invention is possible in light of the above teachings.

What is claimed is:

1. A fuel injection timing control system of an internal combustion engine comprising:
a fuel injection pump of a constant stroke type driven in synchronism with the operation of the internal combustion engine;
a fuel valve operative to automatically effect fuel injection by the pressure under which a fuel is discharged from said fuel injection pump, said fuel valve being connected to said fuel injection pump through a fuel injection pipe;

fuel return means including a return passage and a control valve in said return passage for controlling the return of fuel discharged from the fuel injection pump to a fuel source supplying the fuel to the fuel injection pump;

means for controlling the timing of operation of said control valve to vary the initiation of pressure output from the fuel injection pump and thereby the timing of fuel injection including an angle detector for detecting the crank angular position of the internal combustion engine, a setter for setting a desired advance angle therein, and a comparator for comparing the crank angular position detected by said angle detector with the desired advance angle set in said setter and generating a signal responsive to the output from said comparator for actuating said control valve;

an independent solenoid-operated cut-off valve mounted in said return passage;

a means for sensing an abnormality in fuel injection timing and producing a signal representative thereof; and a drive means for closing said cut-off valve to prevent return fuel flow through said return passage responsive to the signal from said abnormality sensing means.

2. A fuel injection timing control system as claimed in claim 1 wherein said means for controlling the timing of said control valve is an electrically operated system and further comprising means for detecting a failure in said electrically operated system.

* * * * *

UNITED STATES PATENT AND TRADEMARK OFFICE
CERTIFICATE OF CORRECTION

PATENT NO. : 4,630,588
DATED : December 23, 1986
INVENTOR(S) : Sagawa et al

It is certified that error appears in the above-identified patent and that said Letters Patent is hereby corrected as shown below:

On the title page, assignee should read
-- [73] Assignee: Kawasaki Jukogyo Kabushiki Kaisha, Kobe, Japan --.

Signed and Sealed this

Thirteenth Day of October, 1987

Attest:

DONALD J. QUIGG

Attesting Officer

Commissioner of Patents and Trademarks